(12) United States Patent
Kotha (10) Patent No.: US 11,606,189 B2
(45) Date of Patent: Mar. 14, 2023

(54) METHOD AND APPARATUS FOR IMPROVING THE SPEED OF ADVANCED ENCRYPTION STANDARD (AES) DECRYPTION ALGORITHM

(71) Applicant: ARRIS Enterprises LLC, Suwanee, GA (US)

(72) Inventor: Dileep Kumar Kotha, Telangana (IN)

(73) Assignee: ARRIS Enterprises LLC, Suwanee, GA (US)

(*) Notice: Subject to any disclaimer, the term of this patent is extended or adjusted under 35 U.S.C. 154(b) by 676 days.

(21) Appl. No.: 16/531,399

(22) Filed: Aug. 5, 2019

(65) Prior Publication Data

US 2020/0044822 A1    Feb. 6, 2020

Related U.S. Application Data

(60) Provisional application No. 62/714,487, filed on Aug. 3, 2018.

(51) Int. Cl.
*H04L 29/00*  (2006.01)
*H04L 9/06*  (2006.01)
*G06F 17/16*  (2006.01)

(52) U.S. Cl.
CPC .......... *H04L 9/0631* (2013.01); *G06F 17/16* (2013.01)

(58) Field of Classification Search
CPC .............................. H04L 9/0631; G06F 17/16
USPC .......................................................... 380/28
See application file for complete search history.

(56) References Cited

U.S. PATENT DOCUMENTS

2011/0231673 A1* 9/2011 Alekseev ................ G06F 21/72
                                                                          713/190
2017/0373836 A1* 12/2017 Rarick ................... H04L 9/0861

OTHER PUBLICATIONS

R. Riyaldhi, et al., "Improvement of Advanced Encryption Standard Algorithm with Shift Row and S. Box Modification Mapping in Mix Column", 2nd International Conference on Computer Science and Computational Intelligence, Oct. 2017, 7 pgs.
G. Bertoni, et al., "Efficient Software Implementation of AES on 32-bit Platforms", CHES 2002 Workshop, 23 pgs.
S. Tillich, et al., "Instruction Set Extensions for Efficient AES Implementation on 32-bit Processors", Graz University of Technology, Institute for Applied Information Processing and Communications, Inffeldgasse 16a, A-8010 Graz, Austria.

(Continued)

*Primary Examiner* — Jeffrey C Pwu
*Assistant Examiner* — Michael D Anderson
(74) *Attorney, Agent, or Firm* — Chernoff, Vilhauer, McClung & Stenzel, LLP (57) ABSTRACT

A method is provided for decrypting data encrypted according to a cipher key according the advanced encryption standard (AES). The method includes precomputing a product of each element value of an InvMixColumn matrix and each possible value of an input state array and deriving a set of round keys from the cipher key and the set of round keys. The deriving includes providing an initial round key and a plurality of further round keys, performing an initial decryption round, and performing N full decryption rounds at least in part using the precomputed product of each element value of an InvMixColumn matrix and each possible value of the input state array.

12 Claims, 9 Drawing Sheets

(56) References Cited

OTHER PUBLICATIONS

D. A. Osvik, et al., "Fast Software AES Encryption", Laboratory for Cryptologic Algorithms, EPFL, CH-1015 Lausanne, Switzerland 2 Dept. of Electrical Engineering, The Cooper Union, NY 10003, New York, USA 3 Applied Math., Naval Postgraduate School, Monterey CA 93943, USA.
AJ Elbirt, Fast and Efficient Implementation of AES Via Instruction Set Extensions, IEEE, 8 pgs.
D. Bernstein, et al., "New AES Software Speed Records", 18 pgs.

* cited by examiner

METHOD AND APPARATUS FOR IMPROVING THE SPEED OF ADVANCED ENCRYPTION STANDARD (AES) DECRYPTION ALGORITHM

CROSS-REFERENCE TO RELATED APPLICATIONS

This application claims benefit of U.S. Provisional Patent Application No. 62/714,487, entitled "IMPROVING THE SPEED OF ADVANCED ENCRYPTION STANDARD (AES) DECRYPTION ALGORITHM," by Dileep Kotha, filed Aug. 3, 2018, which application is hereby incorporated by reference herein.

BACKGROUND

Field

The present disclosure relates to systems and methods for encrypting and decrypting information, and in particular to a system and method for efficiently decrypting information encrypted according to the advanced encryption standard (AES).

Description of the Related Art

In recent years, cyber security has become an important division for every company that deals with data. Encryption and decryption are two pillars of data protection that are required to be performed with ease as well as ensuring security of the data. In tomorrow's world almost everything must be encrypted to protect the data while it traverses through the internet. At the same time, the intended recipient should receive the data and able to decrypt it fast enough so that convenience is not lost. Two kinds of ciphers are present—symmetric and asymmetric, of which we will deal with AES which is a symmetric cipher. AES is the most widely used symmetric cipher in the world owing to its origins as winner of US NIST (National Institute of Standards and Technology) competition to replace the aging DES in 2001 (See Sarker, M. Z. H., Parvez, M. S., "A cost effective symmetric key cryptographic algorithm for small amount of data," 9th International Multitopic Conference, IEEE INMIC 2005. IEEE; 2005, p. 1-6, which is hereby incorporated by reference herein).

AES is also referred as Rijndael cipher after its inventors, Vincent Rijmen and Joan Daemen. While a symmetric key cipher, and hence inherently less processing intensive than asymmetric key ciphers, AES nonetheless requires significant processing time, much of which is consumed to perform an operation known as MixColumns in the encryption process and its inverse used the decryption process, InvMixColumns. Both MixColumns and InvMixColums are linear mixing operations which operates on columns of a state. What is needed is a system and method for accelerating this process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for decrypting data encrypted according to a cipher key according the advanced encryption standard (AES). In one embodiment, the method comprises precomputing a product of each element value of an InvMixColumn matrix and each possible value of an input state array, deriving a set of round keys from the cipher key, the set of round keys; comprising an initial round key and a plurality of further round keys, performing an initial decryption round, and performing N full decryption rounds at least in part using the precomputed product of each element value of an InvMixColumn matrix and each possible value of the input state array. In another embodiment, the method comprise deriving a set of round keys from the cipher key, the set of round keys comprising an initial round key and a plurality of ordered further round keys, performing an initial decryption round and N full decryption rounds, and performing a final exclusive OR round key operation (XorRoundKey) to generate the decrypted data. The initial decryption round comprises performing an exclusive OR round key operation (XorRoundKey) on a state array comprising the encrypted data to generate a first iterated state array, performing an inverse shift row operation (InvShiftRows) on the first iterated state array to generate a second iterated state array and performing an inverse substitute bytes operation (InvSubBytes) on the second iterated state array to generate a initially iterated state array. The N full decryption rounds are performed by (i) performing the XorRoundKey operation on the initially iterated state array to generate a first further iterated state array, (ii) performing an inverse mix columns operation (InvMixColumn) on the first further iterated state array to generate a second further iterated state array, (iii) performing the InvShiftRows operation on the second further iterated state array to generate a third further iterated state array, (iv) performing the InvSubBytes operation on the third further iterated state array, (v) repeating steps (i)-(iv) with a next round key of the further round keys and the further iterated third array as the initially iterated state array; and (vi) performing a final an exclusive OR round key operation (XorRoundKey) on a state array comprising the encrypted data to generate the decrypted data. In one embodiment, an inverse of a Mix Column matrix (InvMixColumn matrix) in a finite field comprises elements having values selected from the group consisting of 09, 11, 13, and 14, and performing the InvMixColumn operation on the first further iterated state array to generate a second further iterated state array comprises precomputing a product of each of the element values of the InverseMixColumn matrix and each possible value of the first further iterated state array; and determining from the precomputed products, each element of the second further iterated state array.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Framework

The standard Rijndael symmetric block cipher version can encrypt/decrypt plaintext 128 bit blocks using keys with 128-bit, 192-bit, or 256-bit size. The Rijndael cipher has simple structure and suitable to 8-bit and 32-bit processing. The cipher uses computations performed in a number of rounds, which transform plaintext information into ciphertext and conversely, ciphertext into plaintext. The length of the cipher key determines how many rounds are executed. For example, a 128-bit cipher key uses 10 rounds, while a 192-bit cipher key uses 12 rounds and a 256-bit cypher key used use 14 rounds (see Stallings, W., Tahiliani, M. P. Cryptography and network security: principles and practice; vol. 6. Pearson London; 2014, which is hereby incorporated by reference).

AES arithmetic operations are addition, subtraction, multiplication, and division on finite field GF ($2^8$). The performance of AES operations depends on the size (e.g. length) of the cipher key length.

AES encryption is performed in multiple rounds, with each round using a round key derived from the cipher key. Each round has four transformations, SubBytes, Shift Rows, MixColumns, and XOR (or AddRoundKey). AES decryption likewise has four transformations, including Invert Sub Bytes, Invert Shift Rows, Invert Mix Column, and Invert Add Round Key. Each transformation takes any sixteen byte block which as 4×4 matrix and produce matrix output with same dimension (see Stallings, W., Tahiliani, M. P., "Cryptography and Network Security: Principles and Practice," vol. 6. Pearson London; 2014, which is hereby incorporated by reference herein).

Most recent improvement in AES processing has been accomplished in the hardware domain hardware. Satoh et.al optimize AES by using circuit CMOS standard cell library (see Satoh, A., Morioka, S., Takano, K., Munetoh, S., "A compact Rijndael Hardware Architecture with S-box Optimization," Asiacrypt; vol. 2248. Springer; 2001, p. 239-254, which is hereby incorporated by reference herein). Ahmad et. al use combinational logic that implemented by using truth table on Virtex II FPGA chip (see Ahmad, N., Hasan, R., Jubadi, W. M., "Design of AES S-box Using Combinational Logic Optimization," Industrial Electronics & Applications (ISIEA), 2010 IEEE Symposium on. IEEE; 2010, p. 696-699, which is hereby incorporated by reference herein).

Daemen et. al use 32-bit data as basis data unit in AES transformation that improve the execution performance (see Daemen, J. and Rijmen, V., "The design of Rijndael: AES—The Advanced Encryption Standard," Springer Science & Business Media; 2013, which is hereby incorporated by reference herein). Intel uses AES-NI extended instruction set to improve AES algorithm significantly (see Gueron, S., "Advanced Encryption Standard (AES) Instructions Set," Intel at http://softwarecommunityintelcom/articles/eng/3788htm, accessed 2008; 25). There are many other hardware implementation for AES optimization, including Lu, S. T., Wang, S., Han, J., Zeng, X. Y., "Method and Implementation Of Simd Instruction Set Extension for AES Algorithm," Computer Engineering 2011; and Dehbaoui, A, Dutertre, J. M., Robisson, B., Tria, A., "Electromagnetic Transient Faults Injection On a Hardware and a Software Implementation of AES," Fault Diagnosis and Tolerance in Cryptography (FDTC), 2012 Workshop on IEEE; 2012, p. 7-15; De-yu, F. B. Q. "Implementation of Extended Instruction Set for AES Fast Algorithm," Journal of South China University of Technology (Natural Science Edition) 2012; and Bai, R., Liu, H., Zhang, X, "AES and Its Software Implementation Based On ARM920t," Journal of Computer Applications 2011, pages 1295-1301, all of which are incorporated by reference herein.

The processing optimization described below is can be implemented in software alone (e.g. can be implemented without new or different processing hardware) and requires only a few bytes of extra memory (approx. 1 KB) to perform faster lookup operations.

AES Encryption

A summary of AES encryption is presented below. AES decryption involves performing analogous steps in reverse order. Further details regarding AES encryption and decryption can be found at Riyaldhi, Rizky, and Aditya Kurniawan. "Improvement of Advanced Encryption Standard Algorithm With Shift Row and S. Box Modification Mapping in Mix Column." Procedia Computer Science 116 (2017): 401-407.

AES encrypts/decrypts 128 bits at a time. If the plaintext or ciphertext input has more than 128 bits, AES divides it into 128 bit blocks and encrypts/decrypts each block; and then concatenates them.

Figure 1A:
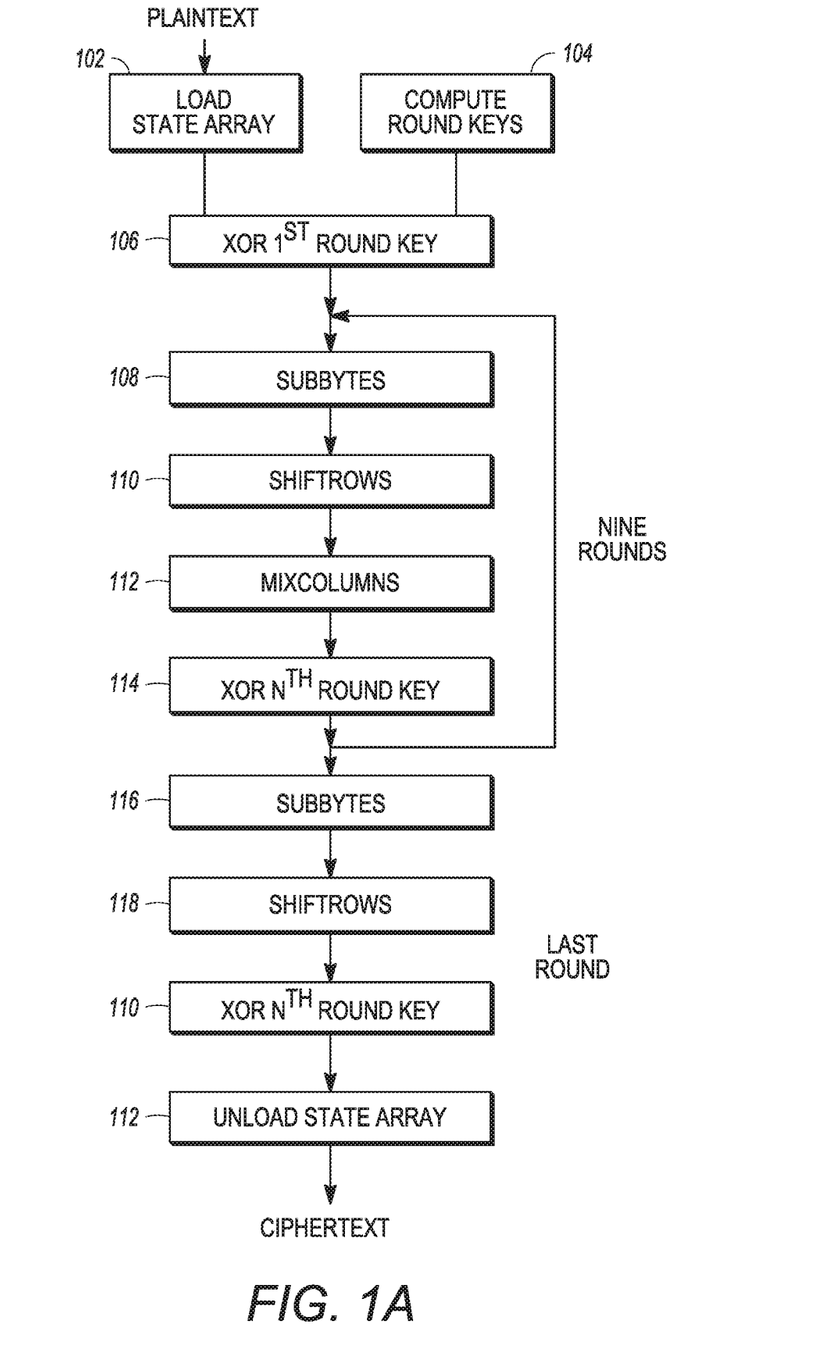
FIGS. 1A and 1B are diagrams depicting AES encryption and decryption, respectively.
Figure 1B:
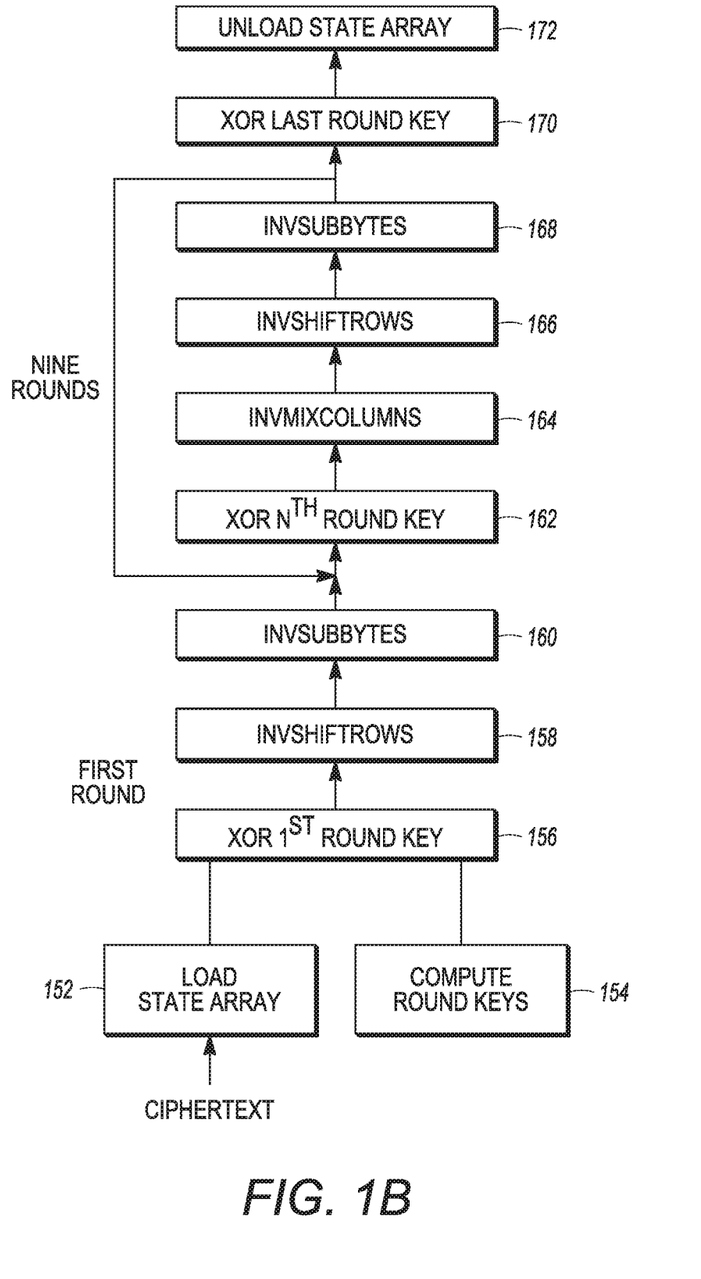

FIGS. 1A and 1B are diagrams depicting AES encryption and decryption, respectively. The steps of AES encryption are as follows. In block 104, AES expands the given cipher key into a plurality of round keys. The round keys are used for each respective round of AES transformation. For simplicity we take 128-bit cipher key, in which case, the AES cipher key is expanded by using the AES cipher key to generate a set of 128-bit round keys that will be combined with the data during encryption. A total of 11 round keys are required because one extra key is added to the initial state array before the rounds start, but the number of keys that need to be generated is typically only 10, because the process may begin by initializing the first round key Rkey0 to the value of the AES cipher key (that is the secret key delivered through the key hierarchy). Alternatively, 11 round keys may be derived. These keys may be viewed as an array of eleven 16-byte values, each made up of four 32-bit words.

As shown in block 102, AES takes the 128-bit plaintext data and puts it in a 4×4 matrix, where each element indicates two hex characters. The initial round key 106 (which, as described above, may be the actual cipher key itself) is added to this 4×4 matrix. The result is referred as state data, state array or state matrix.

Next, nine rounds of AES transformation is performed on the state data, by repeatedly performing the following operations in order Sub Bytes as shown in block 158, Shift Rows as shown in block 110, Mix Column as shown in block 112, and AddRound Key, as shown in block 114. These operations are further described below.

Finally, the result of the foregoing nine rounds of AES transformations is transformed by all but the Mix Column operation (e.g. the Sub Bytes operation is performed in block 116, Shift Rows operation is performed in block 118, and AddRound Key operation is performed in block 110 to result the final state array, which can be unloaded as the ciphertext. The Sub Bytes, Shift Rows, Mix Column, and AddRound Key operations are described below:

Sub Bytes Operation

Figure 2:
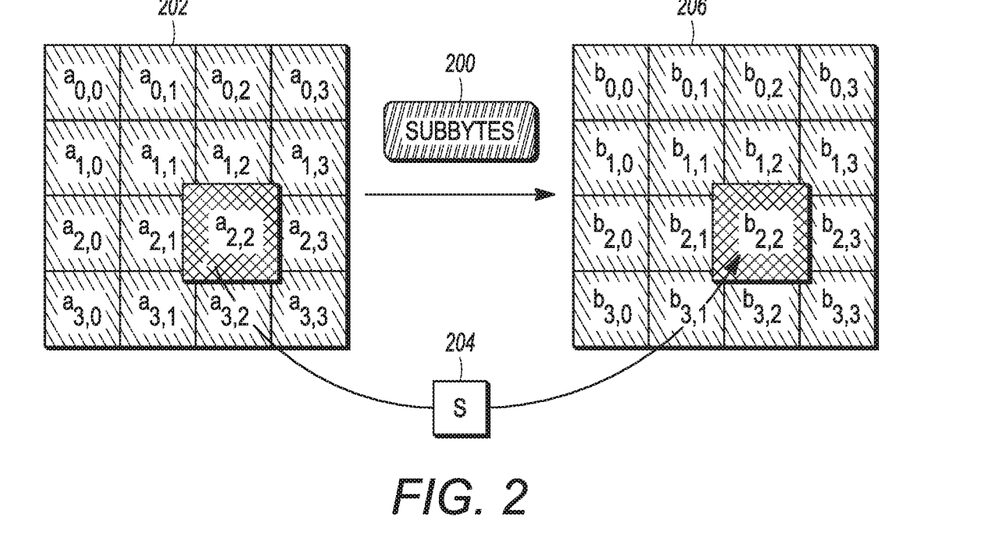
FIG. 2 is a diagram illustrating the Sub Bytes operation or transformation.

FIG. 2 is a diagram illustrating the Sub Bytes operation or transformation 200. The Sub Bytes operation 200 is a transformation process for a non-linear byte substitution using an S-box lookup table 204. The S-box lookup table 204 is 16×16 matrix where each byte (represented by two hex digits) has a corresponding byte to replace. This is done so that inverting it would be easier. This operation is a simple substitution that converts every byte in state array 202 into a different value. AES defines the S-box look up table of 256 values for the substitution. Each of the 16 bytes of the state array 202 are used as an index into the 256-byte substitution table 204, and replace the byte of the state array 202 is replaced with the value from the substitution table 204. Because all possible 256 byte values are present in the table 204, the result is a completely new result in the state array 206, which can be restored to its original contents using an inverse substitution table. The contents of the substitution table 204 are not arbitrary; the entries are computed using a mathematical formula but most implementations will simply have the substitution table 204 stored in memory as part of the design.

Shift Rows Operation

Figure 3:
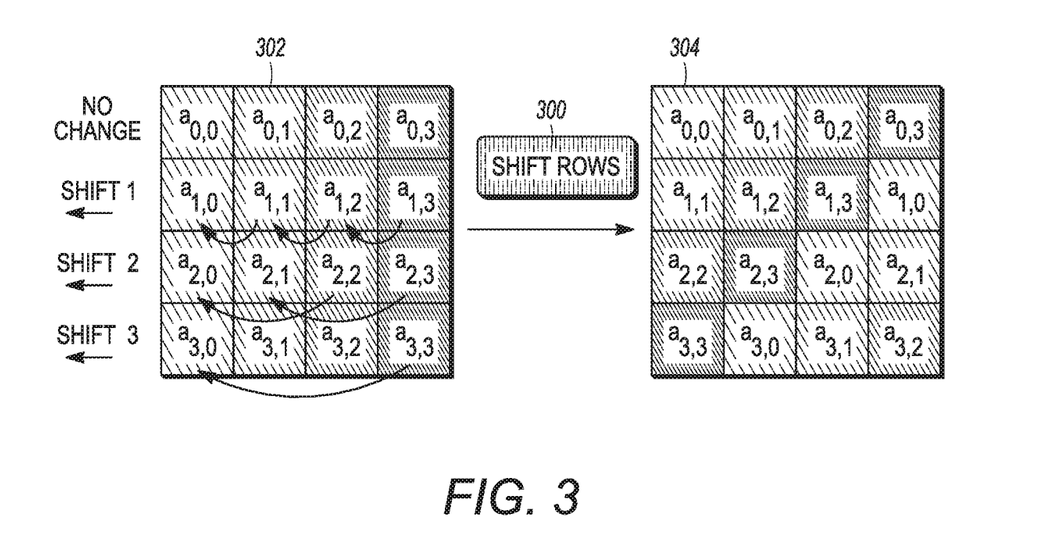
FIG. 3 is a diagram illustrating the Shift Rows operation.

FIG. 3 is a diagram illustrating the Shift Rows operation 300. As the name suggests, ShiftRows operates on each row of the input state array 302. Each row in the input state array 302 is rotated by a certain number of bytes to generate the output state array 304 as follows:
1st Row: rotated by 0 bytes (i.e., is not changed)
2nd Row: rotated by 1 byte
3rd Row: rotated by 2 bytes
4th Row: rotated by 3 bytes This is a cyclical shifting process for the key matrix (isn't this the state data resulting from the SubBytes operation?) in each row.

Mix Column Operation

Figure 4:
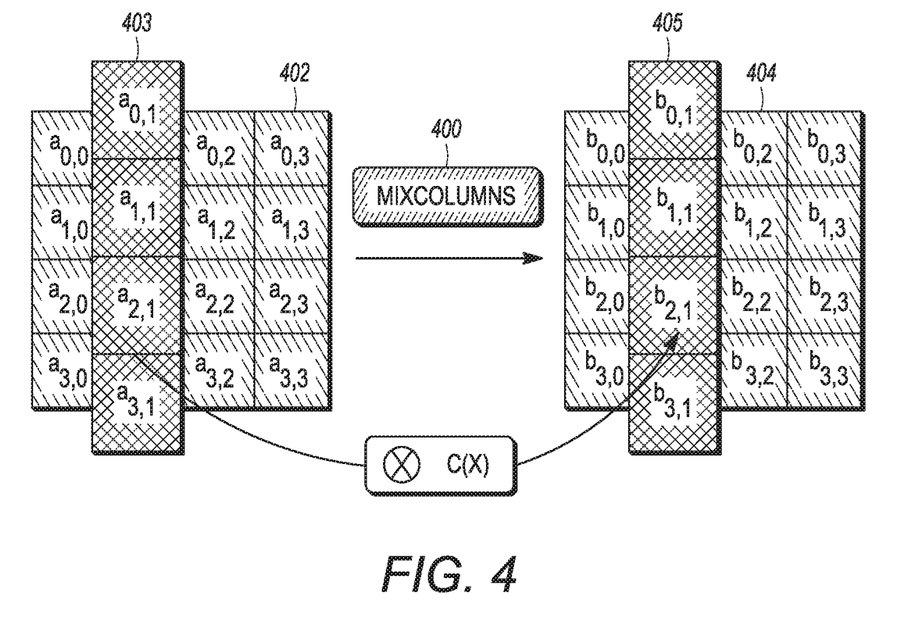
FIG. 4 is a diagram illustrating the Mix Column operation.

FIG. 4 is a diagram illustrating the Mix Column operation 400. In the Mix Column operation 400, each column 403 of the input state array 402 is processed separately to produce a new column 405 that replaces the old column 403 in the output state array 404.

The processing involves matrix multiplication in which each column 403 of the state array 402 is replaced with the resulting column 405. This is a dot matrix operation combined with XOR using matrix finite field GF (28) and Galois Field.

Figure 5:
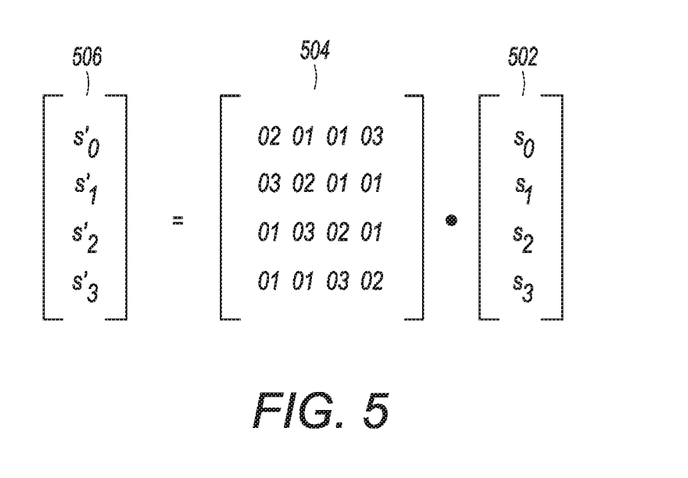
FIG. 5 is a diagram illustrating the Mix Column operation for one column of the state array.

For example, FIG. 5 is a diagram illustrating the Mix Column operation 400 for one column 502 of the state array 402. The new column $s'_0$-$s'_3$ 506 is computed from associated column $s_0$-$s_3$ 502 of the input state array 402 and the MixColumn matrix 504:

$$\begin{bmatrix} s'_0 \\ s'_1 \\ s'_2 \\ s'_3 \end{bmatrix} = \begin{bmatrix} 02 & 01 & 01 & 03 \\ 03 & 02 & 01 & 01 \\ 01 & 03 & 02 & 01 \\ 01 & 01 & 03 & 02 \end{bmatrix} \cdot \begin{bmatrix} s_0 \\ s_1 \\ s_2 \\ s_3 \end{bmatrix}$$

as shown in Equations (1)-(4)

$$s'_0 = 02*s_0 + 01*s_1 + 01*s_2 + 03*s_3 \qquad \text{Equation (1)}$$

$$s'_1 = 03*s_0 + 02*s_1 + 01*s_2 + 01*s_3 \qquad \text{Equation (2)}$$

$$s'_2 = 01*s_0 + 03*s_1 + 02*s_2 + 01*s_3 \qquad \text{Equation (3)}$$

$$s'_3 = 01*s_0 + 01*s_1 + 03*s_2 + 02*s_3 \qquad \text{Equation (4)}$$

The foregoing is computed using finite field arithmetic, which has special rules and both the multiplications and additions can be implemented using XOR. For example, to compute the product $02*s_0$, it is noted that $s_0$ can be converted to a binary value of 8 bits, if necessary by padding the most significant bits with zeros. Noting that the multiplication of a value by another value x (e.g. the value 02 by $s_0$ can be implemented as a 1-bit left shift followed by a conditional bitwise XOR if the leftmost bit of the original value before the shift is 1. This can be performed for $01*s_1$, $01*s_2$, and $03*s_3$. The result (in binary) can be XORed together to implement the addition function and converted to hex to achieve the result for $s'_0$ according to Equation (1). Similar processes can be used to derive values for $s'_1$, $s'_2$, and $s'_3$, using Equations (2), (3) and (4).

Add Round Key

Figure 6:
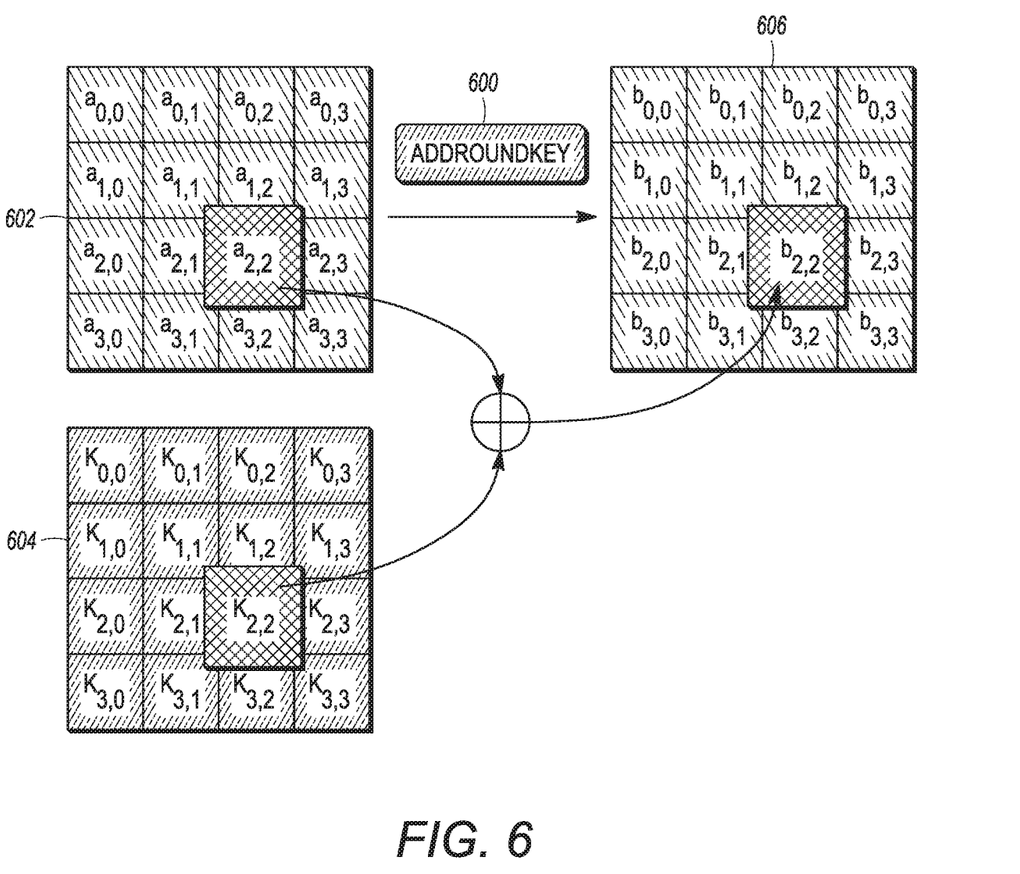
FIG. 6 is a diagram illustrating the Add Round Key operation.

FIG. 6 is a diagram illustrating the Add Round Key operation 600. After the mix Column operation 400, the Add Round Key operation 600 is an XOR addition operation of the round key 604 with the input state array 602. Thus, this operation 600 simply takes the existing input state array 602, XORs the value of the appropriate round key element and the associated element of the input state array 602, and replaces the state array with the result to generate the output state array 606. It is done once before the rounds start and then once per round, using each of the round keys in turn.

Decryption Process

As shown in FIG. 1B, decryption of a ciphertext input is accomplished by reversing all the steps taken in the encryption process using inverse operation InvSubBytes, InvShiftRows, and InvMixColumns. The XorRoundKey operation doesn't need an inverse function because XORing twice returns the original value. The InvSubBytes operation of blocks 160 and 168 operate the same as the SubBytes operations of blocks 108 and 116 but use a different table that returns the original value. Similarly, the InvShiftRows operation of blocks 158 and 166 involve rotating left instead of right and the InvMixColumns operation of block 164 uses a different constant matrix (the InvMixColumns matrix) to multiply the columns. The InvMixColums matrix is shown below:

$$\begin{bmatrix} 14 & 11 & 13 & 19 \\ 09 & 14 & 11 & 13 \\ 13 & 09 & 14 & 11 \\ 11 & 13 & 09 & 14 \end{bmatrix}$$

The order of operation in decryption is as follows. First, the state array is loaded 152 a state array is generated from at least a part of ciphertext. Next, a set of round keys 154 are derived from the cipher key, the set of round keys comprising an initial round key and a plurality of further round keys.

Then, an initial decryption round is performed. The initial decryption round includes the performing the XorRoundKey operation on the input state array as shown in block 156, performing an InvShiftRows operation on the resulting state array as shown in blocks 158, and performing an InvSubBytes operation on the state array resulting from the InvShiftRows operation, as shown in block 160.

Next, nine full decryption rounds are performed on the state array resulting from the initial decryption round. The same round keys are used in the same order, each round includes the following operations, performed in the indicated order: XorRoundKey (block 162), InvMixColumns (block 164), InvShiftRows (block 166), and InvSubBytes (block 168). Finally a final XorRoundKey operation is performed, as shown in block 170, and the output plaintext value is unloaded from the state array, as shown in block 172.

Processing Optimization

Of particular interest for is the Mix Column step which consumes more processing power than any of the steps due to mathematical multiplication/addition operations involved in completing the operation. The similar is the case with Inverse Mix column step.

In Riyaldhi et al. (Riyaldhi, Rizky, and Aditya Kurniawan. "Improvement of Advanced Encryption Standard Algorithm With Shift Row and S. Box Modification Mapping in Mix Column." *Procedia Computer Science* 116 (2017): 401-407) it is proposed to increase the speed of AES encryption using a modification in Mix Column step. This modification avoids the multiplication step with Sbox using extra memory, thus potentially improving the AES encryption speed by 85% on average. Using precomputed Sbox values, storing in memory which are multiples of 2 and 3 they have shown an improvement in AES encryption speed. However, the different reversed order of steps used for AES decryption (the Add Round Key step happens before Mix Column step) does not permit the use of precomputed Sbox values to be used in AES decryption.

The system and method described below enhances the speed of AES decryption using modification in InverseMixColumn step. Results show 37% improvement on an average compared to unmodified Inverse MixColumn step. As described above, the InvMixColums matrix used for the InvMixColumns operation is shown below:

$$\begin{bmatrix} 14 & 11 & 13 & 19 \\ 09 & 14 & 11 & 13 \\ 13 & 09 & 14 & 11 \\ 11 & 13 & 09 & 14 \end{bmatrix}$$

This matrix is an inverse of the MixColumn matrix in Galois Field. An operation called a multiply is performed during the Inverse MixColumn step where the state data is used. The new column $D'_0$-$D'_3$ is computed from associated column $D_0$-$D_3$ of the input state array 402 and the MixColumn matrix 504

$$\begin{bmatrix} s'_0 \\ s'_1 \\ s'_2 \\ s'_3 \end{bmatrix} = \begin{bmatrix} 14 & 11 & 13 & 19 \\ 09 & 14 & 11 & 13 \\ 13 & 09 & 14 & 11 \\ 11 & 13 & 09 & 14 \end{bmatrix} \cdot \begin{bmatrix} s_0 \\ s_1 \\ s_2 \\ s_3 \end{bmatrix}$$

as shown in Equations (5)-(8)

$$s'_0 = 14*s_0 + 11*s_1 + 13*s_2 + 19*s_3 \quad \text{Equation (5)}$$

$$s'_1 = 09*s_0 + 14*s_1 + 11*s_2 + 13*s_3 \quad \text{Equation (6)}$$

$$s'_2 = 13*s_0 + 09*s_1 + 14*s_2 + 11*s_3 \quad \text{Equation (7)}$$

$$s'_3 = 11*s_0 + 13*s_1 + 09*s_2 + 14*s_3 \quad \text{Equation (8)}$$

The multiply (*) operations shown above can be implemented using a multiply function Multiply(x,y) used to multiply numbers in the field GR (2^8). Multiply(x,y) is defined as:

define Multiply(x,y) (((y & 1)*x)^((y>>1 & 1)*
    xtime(x))^((y>>2 & 1)*xtime(xtime(x)))^((y>>3
    & 1)*xtime(xtime(xtime(x))))^((y>>4 &
    1)*xtime(xtime(xtime(xtime(x))))))     Equation (9)

Where "&" represents a logical AND operation, * represents a multiplication operation, "^" represents an exclusive OR operation, ">>N" represents an operation that right shifts bits N times and "<<N" represents an operation that left shifts bits N times. Xtime is another algorithm or function that is expanded as xtime(x)=((x<<1)^(((x>>7) & 1)*0x1b)), and represents multiplication by {02} in decimal by the argument (x) to xtime modulo {1b}, and is equivalent to a shirt operation and a conditional XOR operation.

Also, x is the value of the element of the state array data (e.g. so) and y is the value of the InvMixColumn matrix. Note that the value (y) of any of the InvMixColumn matrix elements can only be 14, 11, 13, or 9, and that the value for (x) for any element of the state array input to the InvMixColumn operation is limited to two hex words, each with 16 possibilities, there are only 16×16 or 256 possible values for each element of the input state array. Hence, the value of 'x' in for each element in state array is limited since it is one of the 256 possible hex numbers(double digit hex). This is due to the reason each 'x' is 8 bit and can hold two hex digits.

Accordingly, precomputation of the result of $14*s_n$, $11*s_n$, $13*s_n$, $09*s_n$, for all 256 possible values of n, the products can be looked up when required instead of computed, thus speeding execution. This can be accomplished, for example, by precomputing the values of $14*s_n$ for each of the 256 values of $s_n$ and storing those values in a 16×16 array, precomputing the values 11*$s_n$, for each of the 256 values of $s_n$ and storing those values in a second 16×16 array, precomputing the values 13*$s_n$, for each of the 256 values of $s_n$ and storing those values in third 16×16 array, and precomputing values for 09*$s_n$, for each of the 256 values of $s_n$ and storing those values in a fourth 16×16 array. This is performed at the cost of additional memory require to store four arrays holding the 256 precomputed hex numbers.

Figure 7:
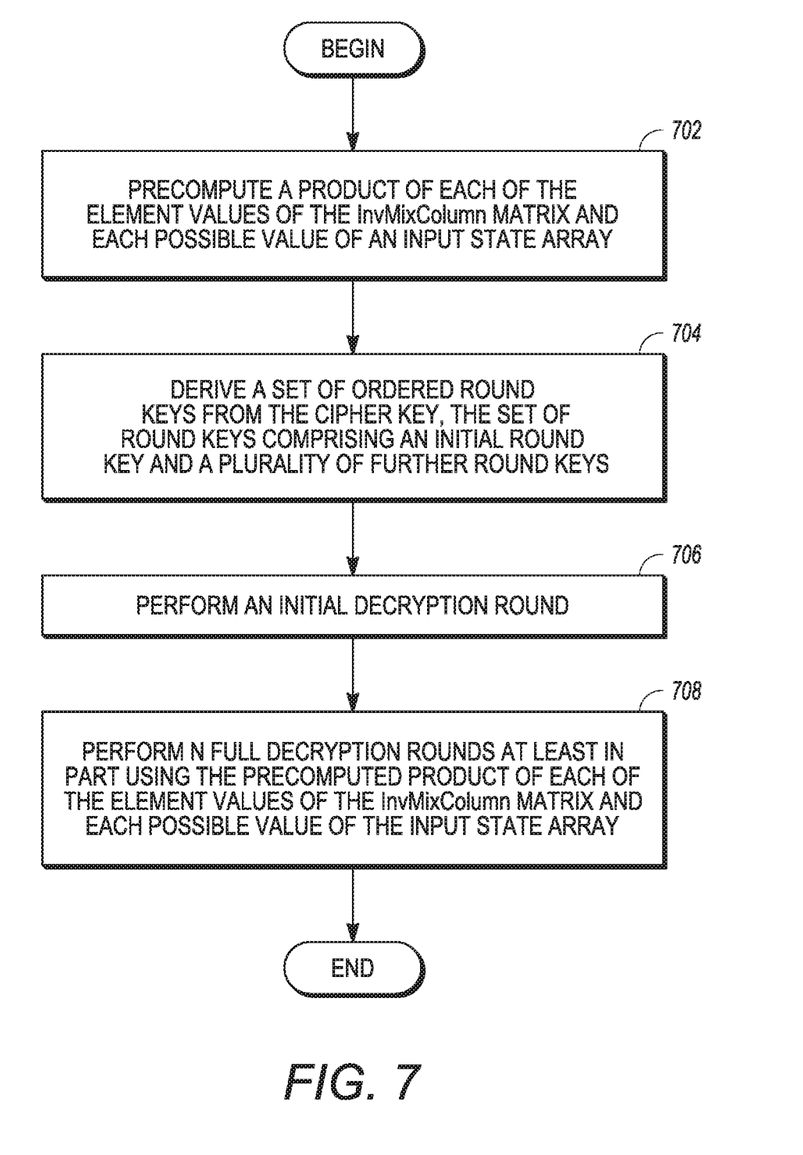
FIG. 7 is a diagram illustrating an exemplary technique for decrypting data encrypted according to a cipher key according to AES.

FIG. 7 is a diagram illustrating an exemplary technique for decrypting data such as a number encrypted according to a cipher key according the advanced encryption standard (AES). In block 702, a product of each of the element values of the InvMixColumn matrix and each possible value of an input state array are precomputed. In block 704, a set of ordered round keys are derived from the cipher key. The set of ordered round keys comprises an initial round key and a plurality of further round keys. In block 706, an initial decryption round is performed at least in part with the initial round key. In block 708, N full decryption rounds are performed with the further round keys, at least in part using the precomputed product of each of the element values of the InvMixColumn matrix and each possible value of the input state array.

Figure 8:
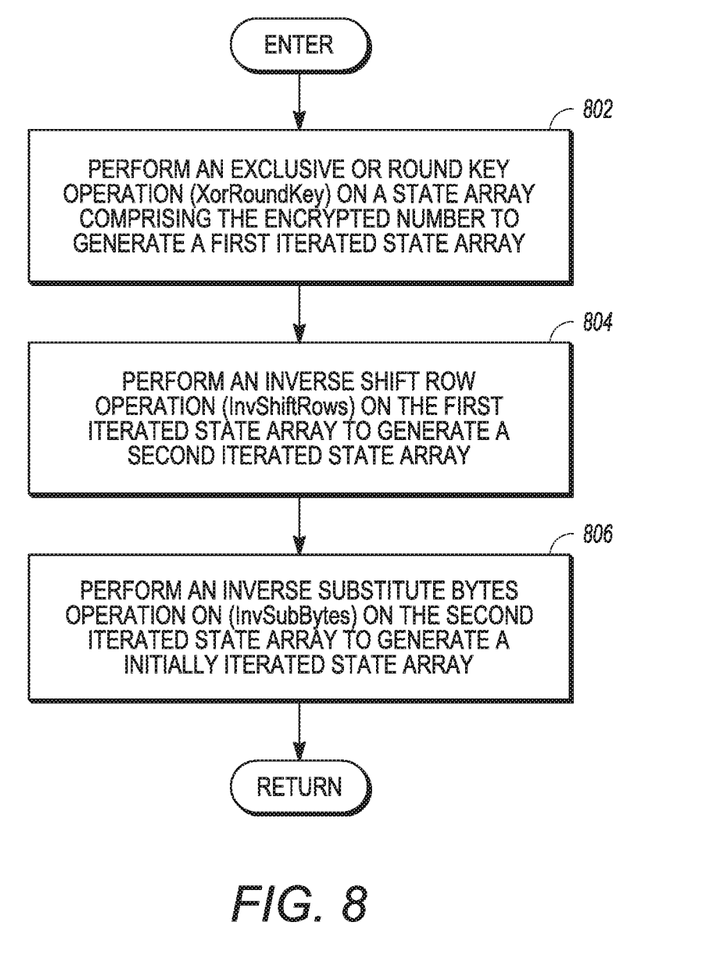
FIG. 8 is a diagram illustrating exemplary steps used to perform the initial decryption round.

FIG. 8 is a diagram illustrating exemplary steps used to perform the initial decryption round. In block 802, an exclusive OR round key operation (XorRoundKey) is performed on a state array comprising the encrypted data to generate a first iterated state array. In block 804, an inverse shift row operation (InvShiftRows) is performed on the first iterated state array to generate a second iterated state array. In block 804, an inverse shift row operation (InvShiftRows) is performed on the first iterated state array (the product of block 802) to generate a second state array. Then, in block 806, an inverse substitute bytes operation (InvSubBytes) is performed on the second iterated state array (the product of block 804) to generate an initially iterated state array. As described above, the steps shown in FIG. 8 are to reverse or invert the operations performed in blocks 166-170 of FIG. 1B and do not include an inverse mix columns (InvMixColumn) step. This inverts the "last round" performed in FIG. 1B. Next, nine rounds to invert the nine rounds performed in blocks 158-164 are performed.

Figure 9:
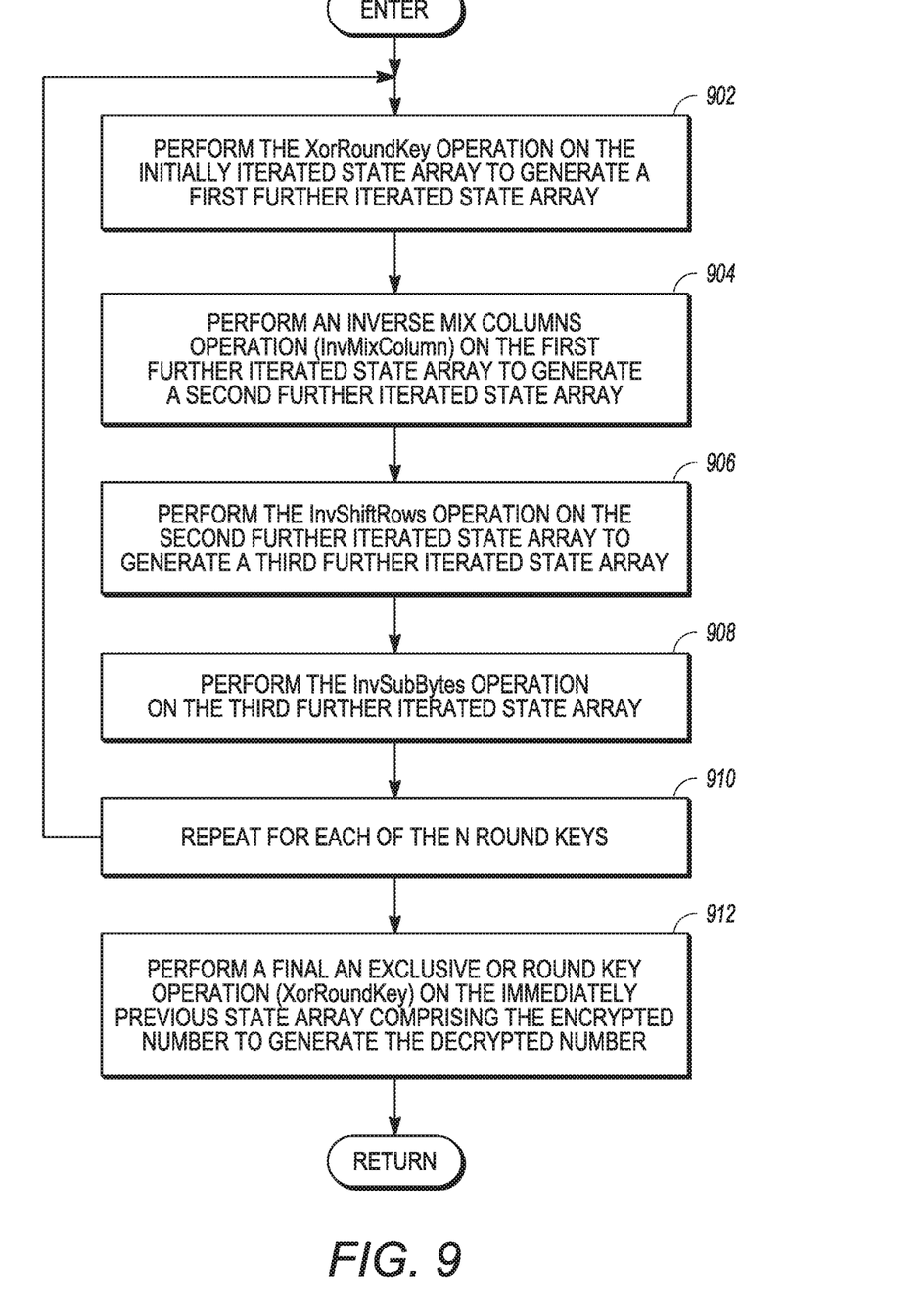
FIG. 9 is a diagram illustrating exemplary steps used to perform the further decryption rounds.

FIG. 9 is a diagram illustrating exemplary steps used to perform the further decryption rounds. In block 902, the XorRoundKey operation is performed on the initially iterated state array (the product of block 806), to generate a first further iterated state array. In block 904, an inverse mix column operation (InvMixColumn) is performed on the first further iterated state array (the product of block 902) to generate a second further iterated state array. IN block 906, an InvShiftRows operation is performed on the second further state array (the product of block 904) to generate a third further iterated state array.

As noted above, the InvMixColumn matrix used to perform the InvMixColumn operation is a finite field and has elements selected from a small number of values (e.g. the InvMixColumn matrix elements have values that are either 09, 11, 13 or 14, and no others). Hence, the InvMixColumn operation on the first further iterated state array can be performed with precomputed values. For example, a product of each of the elements of the InvMixColumn matrix and each of the 256 possible values of the first iterated state array can be precomputed and used in the foregoing computations, and each element of the second further iterated state array determined from these precomputed products. In one embodiment, a 16×16 or 256 element array for each possible value of the InvMixColumn matrix can be computed. For example, for the possible InvMixColumn matrix element value of 09, an array or matrix can be defined:

$$\begin{bmatrix} 09*s_{1,1} & \cdots & 09*s_{1,16} \\ \vdots & \ddots & \vdots \\ 09*s_{16,1} & \cdots & 09*s_{16,16} \end{bmatrix}$$

where $s_{n,m}$ reflects the value of the input state array, and * denotes a multiplication operation. This multiplication may be precomputed using Equation 9 above. Hence, to determine the product of each element of each row of the InverseMixColumn matrix and the corresponding element of the associated column of the first further iterated state array, the value of the element of the InverseMixColumn matrix under consideration (in the foregoing example, 09) can be used to determine the appropriate precomputed matrix of values, then the desired product determined from the value of the element of the state array.

Returning to FIG. 9, the round is completed in block 908 by performing the InvSubBytes operation on the third further iterated state array (the product of block 906). Block 910 repeats steps 902-908, N times (in the current example, nine times), each time with the associated round key. These operations essentially invert the operations performed in blocks 158-164 of FIG. 1A. Finally, block 912 performs a final exclusive or round key operation (XorRoundKey) on the previous iterated state array to generate the decrypted data, essentially inverting the operations performed in block 156 of FIG. 1B.

Hardware Environment

Figure 10:
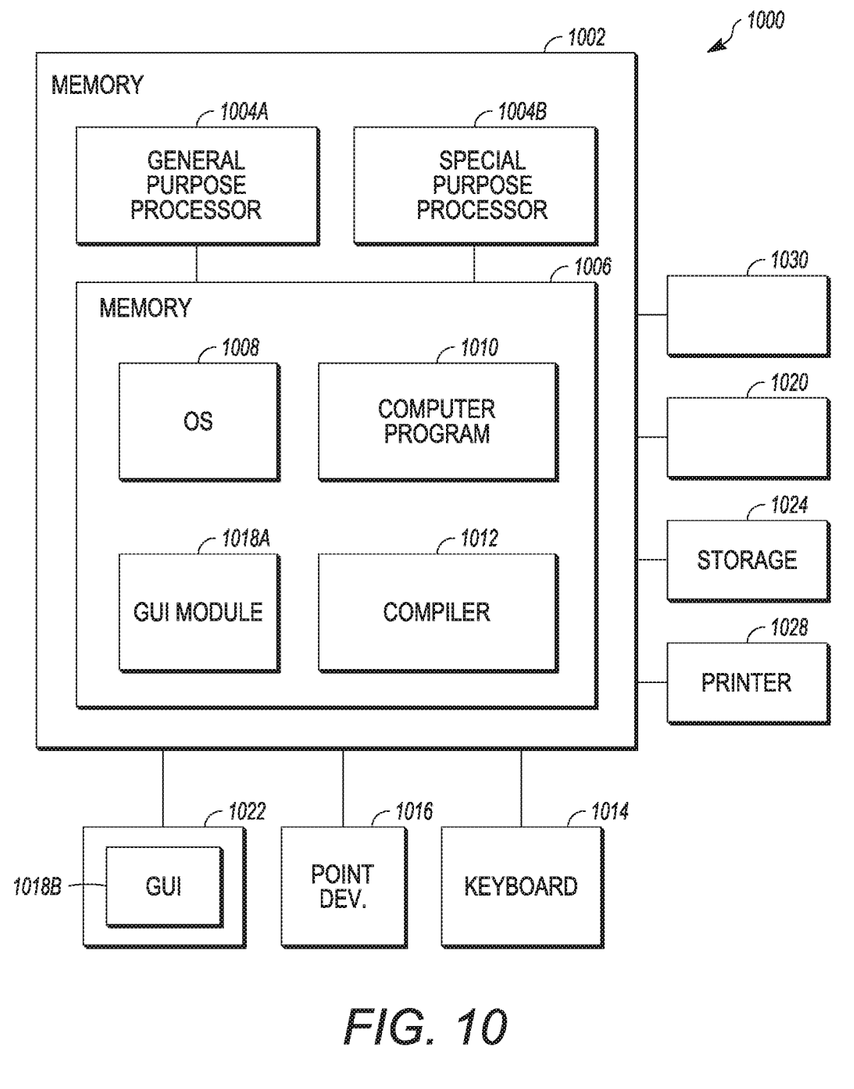
FIG. 10 is a diagram illustrating an exemplary processing system that could be used to implement processing elements of an encryption and/or decryption system.

FIG. 10 illustrates an exemplary processing system 1000 that could be used to implement processing elements of the above disclosure. The processing system comprises a computer 1002 that comprises one or more processors such as a general purpose processor 1004A and a special purpose processor 1004B (hereinafter alternatively referred to as processor(s) 1004) and a memory, such as random access memory (RAM) 1006. The computer 1002 s operatively coupled to a display 1022, which presents images such as windows to the user on a graphical user interface 1018B. The computer 1002 may be coupled to other devices, such as a keyboard 1014, a mouse device 1016, a printer 1028, etc. Of course, those skilled in the art will recognize that any combination of the above components, or any number of different components, peripherals, and other devices, may be used with the computer 1002.

Generally, the computer 1002 operates under control of an operating system 1008 stored in the memory 1006, and interfaces with the user to accept inputs and commands and to present results through a graphical user interface (GUI) module 1018A. Although the GUI module 1018B is depicted as a separate module, the instructions performing the GUI functions can be resident or distributed in the operating system 1008, the computer program 1010, or implemented with special purpose memory and processors. The computer 1002 also implements a compiler 1012 which allows an application program 1010 written in a programming language such as COBOL, C++, FORTRAN, or other language to be translated into processor 1004 readable code. After completion, the application 1010 accesses and manipulates data stored in the memory 1006 of the computer 1002 using the relationships and logic that was generated using the compiler 1012. The computer 1002 also optionally comprises an external communication device such as a modem, satellite link, Ethernet card, or other device for communicating with other computers.

In one embodiment, instructions implementing the operating system 1008, the computer program 1010, and the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of instructions which, when read and executed by the computer 1002, causes the computer 1002 to perform the operations herein described. Computer program 1010 and/or operating instructions may also be tangibly embodied in memory 1006 and/or data communications devices 1030, thereby making a computer program product or article of manufacture. As such, the terms "article of manufacture," "program storage device" and "computer program product" as used herein are intended to encompass a computer program accessible from any computer readable device or media.

Devices for performing the operations described herein may be simplified versions of the processing system 1000 disclosed above. For example, the processing system 1000 may include only a general purpose processor 1004A and a memory 1006 storing processor instruction for performing the described operations. Or, the processing system may include only a special purpose processor 1004B that includes the required processing instructions stored in a memory integral to the special purpose processor 1004B, memory 1006, or external memory via communications link(s). Further, such devices may include on or more hardware circuits that perform at least a portion of the operations described herein.

Those skilled in the art will recognize many modifications may be made to this configuration without departing from the scope of the present disclosure. For example, those skilled in the art will recognize that any combination of the above components, or any number of different components, peripherals, and other devices, may be used.

What is claimed is:

1. A method of decrypting data encrypted according to a cipher key according the advanced encryption standard (AES), comprising:
   (a) deriving a set of round keys from the cipher key, the set of round keys comprising an initial round key and a plurality of ordered further round keys;
   (b) performing an initial decryption round, comprising:
      performing an exclusive OR round key operation (XorRoundKey) on a state array comprising the encrypted data to generate a first iterated state array;
      performing an inverse shift row operation (InvShiftRows) on the first iterated state array to generate a second iterated state array;
      performing an inverse substitute bytes operation (InvSubBytes) on the second iterated state array to generate a initially iterated state array;
   (c) performing N full decryption rounds, comprising:
      (i) performing the XorRoundKey operation on the initially iterated state array to generate a first further iterated state array;
      (ii) performing an inverse mix columns operation (InvMixColumn) on the first further iterated state array to generate a second further iterated state array;
      (iii) performing the InvShiftRows operation on the second further iterated state array to generate a third further iterated state array;
      (iv) performing the InvSubBytes operation on the third further iterated state array;
      (v) repeating steps (i)-(iv) with a next round key of the further round keys and the further iterated third array as the initially iterated state array;
      (vi) performing a final an exclusive OR round key operation (XorRoundKey) on a state array comprising the encrypted data to generate the decrypted data;
   wherein:
      an inverse of a Mix Column (InverseMixColumn) matrix in a finite field comprises elements having values selected from the group consisting of 09, 11, 13, and 14;
      performing the InvMixColumn operation on the first further iterated state array to generate a second further iterated state array comprises:
         precomputing a product of each of the element values of the InverseMixColumn matrix and each possible value of the first further iterated state array; and
         determining from the precomputed products, each element of the second further iterated state array.

2. The method of claim 1, wherein:
   the precomputed products of each element value of the InverseMixColumn matrix and each possible value of the first further iterated state array are stored in a respective precomputed value array; and
   determining from the precomputed products, each element of the second further iterated state array comprises:
      computing each element of the second further iterated state array from the precomputed products stored in the respective precomputed value array.

3. The method of claim 2, wherein computing each element of the second further iterated state array from the precomputed products stored in the respective precomputed value array comprises:
   computing each column of the second further iterated state array as a product of the InverseMixColumn matrix and the associated column of the first further iterated state array.

4. The method of claim 3, wherein:
   the product of the InvMixColumn matrix and the associated column of the first further iterated state array is a sum of a product of each element of each row of the InvMixColumn matrix and a corresponding element of the associated column of the first further iterated state array; and
   the product of each element of each row of the InvMixColumn matrix and a corresponding element of the associated column of the first further iterated state array is determined by:
      determining a value of the element of the InvMixColumn matrix; and
      looking up, in the precomputed value array associated with the value of the element of the InvMixColumn matrix, a product of the value of the element of the InvMixColumn matrix and the value of the element of the first further iterated state array corresponding to the element of the InvMixColumn matrix.

5. An apparatus for decrypting data encrypted according to a cipher key according the advanced encryption standard (AES), comprising:
   a processor;

a memory, communicatively coupled to the processor, the memory storing processor instructions comprising processor instructions for:
(a) deriving a set of round keys from the cipher key, the set of round keys comprising an initial round key and a plurality of ordered further round keys;
(b) performing an initial decryption round, comprising:
performing an exclusive OR round key operation (XorRoundKey) on a state array comprising the encrypted data to generate a first iterated state array;
performing an inverse shift row operation (InvShiftRows) on the first iterated state array to generate a second iterated state array;
performing an inverse substitute bytes operation (InvSubBytes) on the second iterated state array to generate a initially iterated state array;
(c) performing N full decryption rounds, comprising:
(i) performing the XorRoundKey operation on the initially iterated state array to generate a first further iterated state array;
(ii) performing an inverse mix columns operation (InvMixColumn) on the first further iterated state array to generate a second further iterated state array;
(iii) performing the InvShiftRows operation on the second further iterated state array to generate a third further iterated state array;
(iv) performing the InvSubBytes operation on the third further iterated state array;
(v) repeating steps (i)-(iv) with a next round key of the further round keys and the further iterated third array as the initially iterated state array;
(vi) performing a final an exclusive OR round key operation (XorRoundKey) on a state array comprising the encrypted data to generate the decrypted data;
wherein:
an inverse of a MixColumn (InverseMixColumn) matrix in a finite field comprises elements having values selected from the group consisting of 09, 11, 13, and 14;
the processor instructions for performing the InvMixColumn operation on the first further iterated state array to generate a second further iterated state array comprise processor instructions for:
precomputing a product of each of the element values of the InverseMixColumn matrix and each possible value of the first further iterated state array; and
determining from the precomputed products, each element of the second further iterated state array.

6. The apparatus of claim 5, wherein:
the precomputed products of each element value of the InverseMixColumn matrix and each possible value of the first further iterated state array are stored in a respective precomputed value array; and
the processor instructions for determining from the precomputed products, each element of the second further iterated state array comprise processor instructions for:
computing each element of the second further iterated state array from the precomputed products stored in the respective precomputed value array.

7. The apparatus of claim 6, wherein the processor instructions for computing each element of the second further iterated state array from the precomputed products stored in the respective precomputed value array comprise processor instructions for:
computing each column of the second further iterated state array as a product of the InverseMixColumn matrix and the associated column of the first further iterated state array.

8. The apparatus of claim 7, wherein:
the product of the InverseMixColumn matrix and the associated column of the first further iterated state array is a sum of a product of each element of each row of the InverseMixColumn matrix and a corresponding element of the associated column of the first further iterated state array; and
the product of each element of each row of the InverseMixColumn matrix and a corresponding element of the associated column of the first further iterated state array is determined by:
determining a value of the element of the InverseMixColumn matrix; and
looking up, in the precomputed value array associated with the value of the element of the InverseMixColumn matrix, a product of the value of the element of the InverseMixColumn matrix and the value of the element of the first further iterated state array corresponding to the element of the InverseMixColumn matrix.

9. An apparatus for decrypting data encrypted according to a cipher key according the advanced encryption standard (AES), comprising:
means for deriving a set of round keys from the cipher key, the set of round keys comprising an initial round key and a plurality of ordered further round keys;
means for performing an initial decryption round, comprising:
performing an exclusive OR round key operation (XorRoundKey) on a state array comprising the encrypted data to generate a first iterated state array;
performing an inverse shift row operation (InvShiftRows) on the first iterated state array to generate a second iterated state array;
performing an inverse substitute bytes operation (InvSubBytes) on the second iterated state array to generate a initially iterated state array;
means for performing N full decryption rounds, comprising:
(i) performing the XorRoundKey operation on the initially iterated state array to generate a first further iterated state array;
(ii) performing an inverse mix columns operation (InvMixColumn) on the first further iterated state array to generate a second further iterated state array;
(iii) performing the InvShiftRows operation on the second further iterated state array to generate a third further iterated state array;
(iv) performing the InvSubBytes operation on the third further iterated state array;
(v) repeating steps (i)-(iv) with a next round key of the further round keys and the further iterated third array as the initially iterated state array;
(vi) performing a final an exclusive OR round key operation (XorRoundKey) on a state array comprising the encrypted data to generate the decrypted data;
wherein:
an inverse of a Mix Column matrix (InvMixColumn matrix) in a finite field comprises elements having values selected from the group consisting of 09, 11, 13, and 14;

performing the InvMixColumn operation on the first further iterated state array to generate a second further iterated state array comprises:
    precomputing a product of each of the element values of the InverseMixColumn matrix and each possible value of the first further iterated state array; and
    determining from the precomputed products, each element of the second further iterated state array.

10. The apparatus of claim 9, wherein:
the precomputed products of each element value of the InverseMixColumn matrix and each possible value of the first further iterated state array are stored in a respective precomputed value array; and
the means for determining from the precomputed products, each element of the second further iterated state array comprises:
    means for computing each element of the second further iterated state array from the precomputed products stored in the respective precomputed value array.

11. The apparatus of claim 10, wherein computing each element of the second further iterated state array from the precomputed products stored in the respective precomputed value array comprises:
    computing each column of the second further iterated state array as a product of the InverseMixColumn matrix and the associated column of the first further iterated state array.

12. The apparatus of claim 11, wherein:
the product of the InvMixColumn matrix and the associated column of the first further iterated state array is a sum of a product of each element of each row of the InvMixColumn matrix and a corresponding element of the associated column of the first further iterated state array; and
the product of each element of each row of the InvMixColumn matrix and a corresponding element of the associated column of the first further iterated state array is determined by:
    determining a value of the element of the InvMixColumn matrix; and
    looking up, in the precomputed value array associated with the value of the element of the InvMixColumn matrix, a product of the value of the element of the InvMixColumn matrix and the value of the element of the first further iterated state array corresponding to the element of the InverseMixColumn matrix.

* * * * *